United States Patent [19]

Shorrock

[11] Patent Number: 4,651,404
[45] Date of Patent: Mar. 24, 1987

[54] MACHINE TOOL

[75] Inventor: Peter Shorrock, Sharnbrook, England

[73] Assignee: Leslie Hartridge, Limited, Buckingham, England

[21] Appl. No.: 491,800

[22] Filed: May 5, 1983

[30] Foreign Application Priority Data

May 5, 1982 [GB] United Kingdom ............... 8212912

[51] Int. Cl.⁴ ........................................... B23Q 3/157
[52] U.S. Cl. ....................................... 29/563; 29/568; 409/198; 409/221
[58] Field of Search ............... 409/168, 224, 235, 165, 409/163, 164, 198, 221, 222, 223, 226, 225, 191; 408/89; 29/564, 563, 568

[56] References Cited

U.S. PATENT DOCUMENTS

| 1,539,471 | 5/1925 | Deuring | 409/165 X |
| 2,224,108 | 12/1940 | Ridgwat | 409/191 |
| 2,271,848 | 2/1942 | Tcimpidis | 409/198 |
| 2,353,480 | 7/1944 | Marsilius | 409/198 X |
| 3,293,990 | 12/1966 | Deflandre | 409/165 |
| 3,361,033 | 1/1968 | Muller | 409/168 |
| 3,460,435 | 8/1969 | Hucks et al. | 409/235 X |
| 3,587,630 | 6/1971 | Oxenham | 408/13 X |
| 4,012,818 | 3/1977 | Dornbluth et al. | 29/568 X |
| 4,182,601 | 2/1980 | Aldrin | 409/221 X |
| 4,404,506 | 9/1983 | Nishimura et al. | 29/568 X |
| 4,422,265 | 12/1983 | Branston | 409/198 X |
| 4,423,546 | 1/1984 | Scott et al. | 29/568 |
| 4,425,061 | 1/1984 | Ilindl et al. | 408/13 X |

FOREIGN PATENT DOCUMENTS 2032813  5/1980  United Kingdom ............... 29/564

Primary Examiner—Gil Weidenfeld
Assistant Examiner—Glenn L. Webb
Attorney, Agent, or Firm—Berman, Aisenberg & Platt

[57] ABSTRACT

A machine tool having an indexable workpiece support and a tool holder which is moveable to enable the machine tool to operate on different parts of a workpiece while the latter is held stationary by the workpiece support, indexing of the workpiece support enabling a part thereof to be turned from a first position in which a workpiece can be mounted on that part, to a second position to present such a workpiece to the tool holder, whereby one workpiece can be loaded on one part of the workpiece support while another workpiece on another part of the workpiece support is being simultaneously machined by the machine tool.

8 Claims, 3 Drawing Figures

MACHINE TOOL

The present invention relates to a machine tool which can operate on different parts of a workpiece whilst the latter is being held by a workpiece support of the machine tool. The term "machine tool" is used here to refer to a power-driven machine, for cutting, boring, shaping, sizing, finishing or otherwise operating on a workpiece, such as a drilling machine, milling machine, planing machine grinding machine or shaping machine, or a machine which combines the functions of one or more of the foregoing machines. The invention especially, but not exclusively, relates to a drilling machine for working on a metal workpiece.

One such previously proposed machine tool has one and the same station for loading a workpiece, operating on it, cleaning it and removing it. Such a machine may be idle between unloading of one workpiece and loading of the next, and in any case each workpiece has to be loaded, machined, and then unloaded before the next workpiece can be dealt with. It therefore suffers the problem of a relatively low rate at which it can machine successive workpieces.

The present invention seeks to improve the rate at which successive workpieces can be machined. Accordingly, the present invention is directed to a machine tool having an indexable workpiece support and a tool holder which is moveable to enable the machine tool to operate on different parts of a workpiece whilst the latter is held stationary by the workpiece support, indexing of the workpiece support enabling a part thereof to be turned from a first position in which a workpiece can be mounted on that part, to a second position to present such a workpiece to the tool holder, whereby one workpiece can be loaded on one part of the workpiece support whilst another workpiece on another part of the workpiece support is being simultaneously machined by the machine tool.

A further problem encountered by a previously proposed machine is that the swarf cut or otherwise removed from successive workpieces operated on by the machine accumulates on the work table and/or other components of the machine. This has to be removed frequently, or else clogging up of slide tracks for example, or other obstruction of or damage to parts of the machine or the workpiece, may occur. As a result, the machine may be idle for periods of time while the swarf is being cleared away, and it requires continuous supervision by an operator even when it is performing a series of routines which are controlled automatically.

In one preferred construction embodying the present invention, therefore, the machine has a rotatable cubic or cuboid table or other workpiece support which can be indexed in either direction, for example about a substantially horizontal axis, to present different faces of the cube or other support to a tool holder of the machine. With this construction, the tool-holding part of the machine can be to one side of the table or other support, generally at the same horizontal level. One workpiece can be loaded on a face of the cube or other support which is for the time being uppermost, whilst the machine is simultaneously operating on a workpiece for the time being on the side face of the cube or other support facing the rotary tool holder. Swarf can then drop down a vertical gap between the tool-holding part of the machine and the workpiece supporting part of the machine. Any swarf remaining on a workpiece which has been machined and which is for the time being on the bottom face of the cube or support can be cleaned by a jet or jets of compressed air or coolant, for example, and a further fine-cleaning operation may be carried out simultaneously on the face of the cube or support which is for the time being furthest from the tool-holding part of the machine.

Because the tool holder is moved for operation on different parts of the workpiece, rather than the table or other workpiece support, a much quicker relative movement between the tool holder and workpiece support is possible by virtue of the lower known mass, and consequent lower inertia, of the tool holder compared to the workpiece support which may carry workpieces and fixtures of varying mass.

An example of a machine tool in accordance with the present invention is illustrated in the accompanying drawings, in which.

Figure 1:
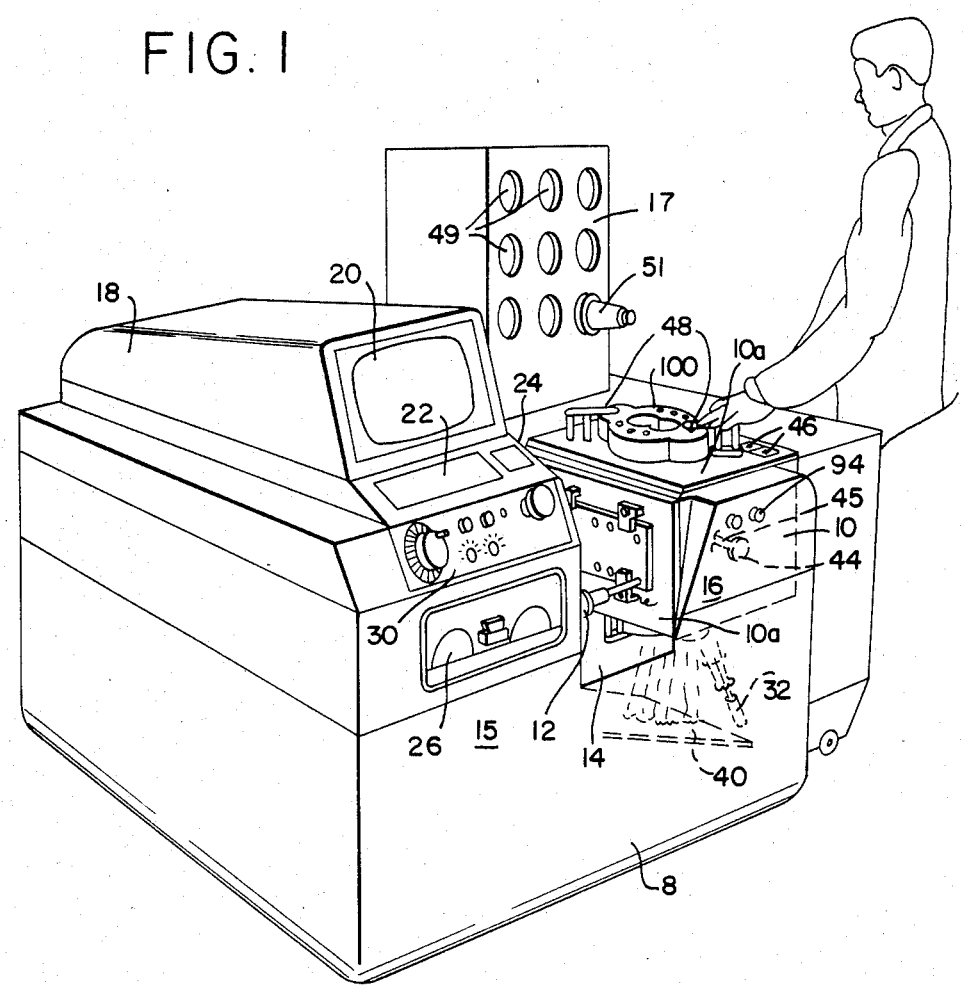
FIG. 1 shows a perspective elevational view of a drilling machine.

The drilling machine shown in FIG. 1 comprises a housing 8, an indexable cubic or cuboid table 10 and a spindle nose 12 mounted in the housing 8, the spindle nose 12 being spaced to one side of the table 10 so that it is generally at the same horizontal level as the table, and so that there is a vertically extending gap 14 between the part 15 of the machine which supports the spindle nose and the part 16 which supports the table. The spindle nose 12 may be part of a turret arrangement (not shown).

The machine further comprises an "egg-box" tool store 17, and a control computer 18 comprising a cathode ray tube 20, alphanumeric key-boards 22 and 24, and a memory tape unit 26. A further control panel 30 is provided underneath the keyboards of the computer 18, for direct manual control of the machine, as opposed to the automatic control by the computer.

An automatically adjustable nozzle or injector 32 is mounted within the housing 8 of the machine, underneath the table 10. A compressed air supply (not shown) is connected to this nozzle so that a jet of compressed air can be directed towards the underside of the table 10. A sloping swarf-collecting plate 40 extends underneath the gap 14 and also underneath table 10 down to a swarf-collecting tray (not shown) to one side of the machine.

The table 10 is mounted on bearings 44 which allow it to be rotated by a drive motor (not shown) about a horizontal axis 45 which extends substantially at right angles to the axis of rotation of the spindle nose 12. The drive motor is adapted to rotate the table through 90* steps about the axis 45. The four sides 10a of the cubic table 10 which are parallel to its axis of rotation, and which constitute the working faces 10a of the table, are provided with a matrix of fixing formations 46 whereby clamps 48 can be used to hold workpieces of various shapes and sizes on those work faces.

Figure 2:
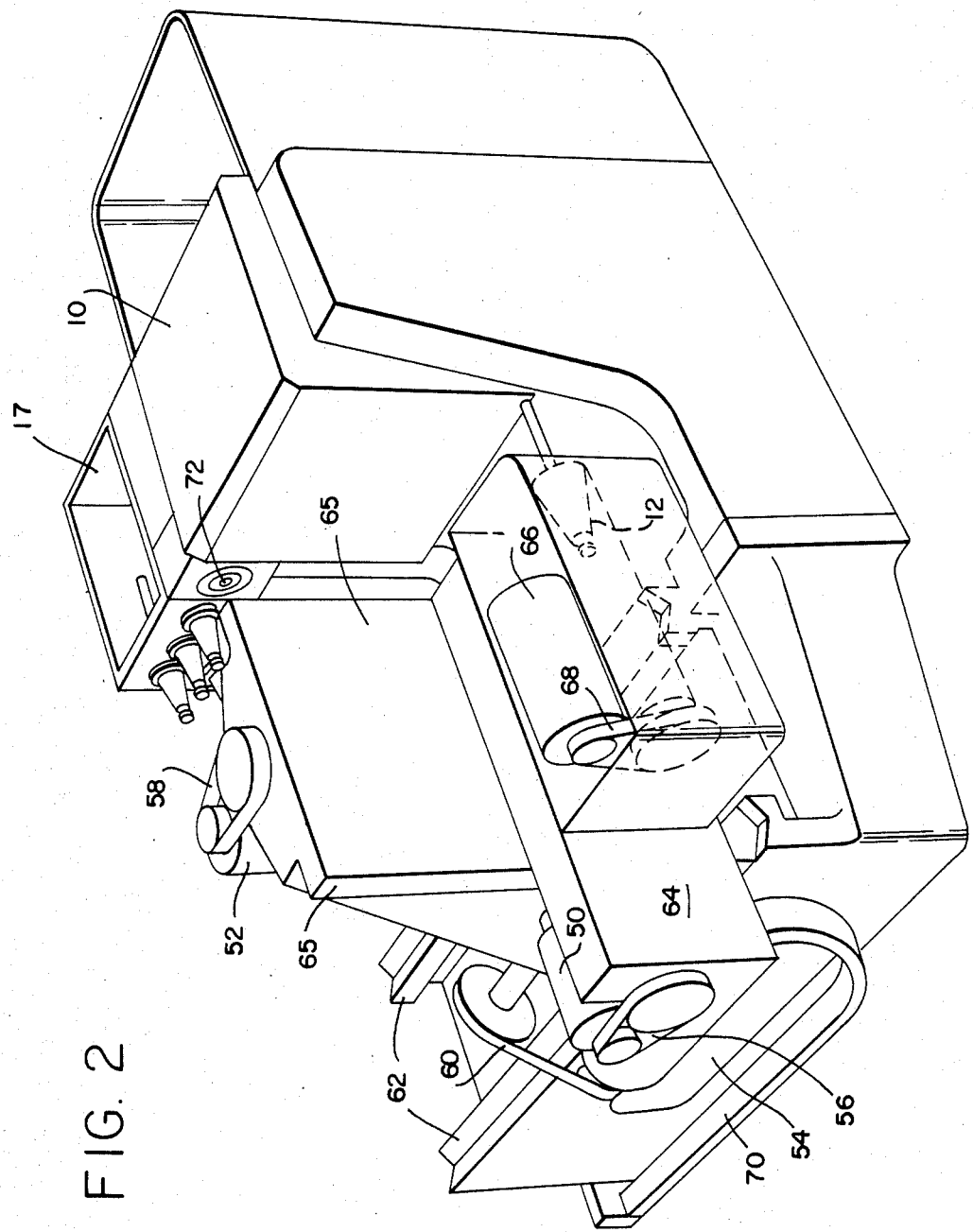
FIG. 2 shows a perspective elevational view of parts of the machine shown in FIG. 1, an outer casing and certain peripherals of the machine having been removed to reveal internal drive components of the machine.

The egg-box store 17 is provided with apertures 49 at least on one of its main faces to receive respective tools and is rotatable about a vertical axis, and also moveable vertically, to allow it to be moved from the position in which it is shown in FIG. 1, which allows easy replacement by an operator of one or more of the tools which it holds, to the position it occupies in FIG. 2 which allows easy selective access to the tool store 17 by the spindle nose 12, so that the latter can automatically remove any selected one of the tools held in the store 17. To facilitate this, every tool is held by a tool holder 51, which is the same for each tool and has a tapered portion which fits into the spindle nose 12.

Three drive motors 50, 52 and 54 are arranged to shift the spindle nose 12 along three mutually-perpendicular axes via respective drive couplings 56, 58 and 60: two horizontal axes being defined by guide tracks 62 and a side wall 64, and one vertical travel axis being defined by vertically extending flanges 65. A further drive motor 66 is connected to rotate the spindle nose 12 via a coupling 68.

An armoured flexible conduit 70 (only part of which is shown in FIG. 2) contains cables which interconnect the various drive motors 50, 52, 54 and 66 and other electrical components to the control computer 18, so that the computer can control the switching of these motors and other functions. FIG. 2 also shows a zeroing or offsetting "target" 72. This detects the distance of the tip of a tool from the spindle nose 12 to provide the computer with the necessary zeroing or offsetting value from which, together with information as regards the size and shape of the tool and the workpiece, it can determine what movement of the spindle nose 12 is required to drill a hole of a given depth into the workpiece.

Figure 3:
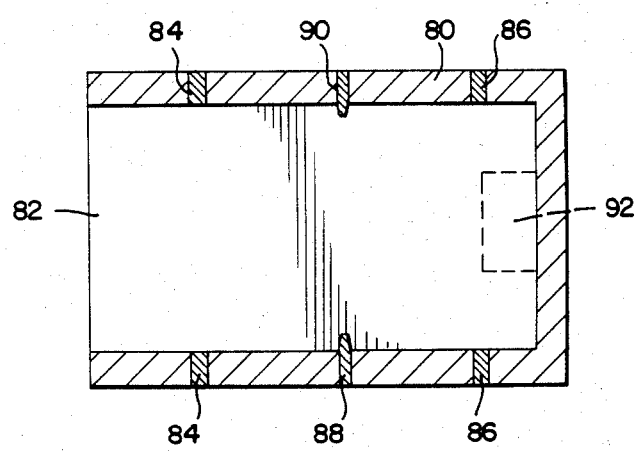
FIG. 3 is a diagrammatic cross-sectional view of a zeroing or off-setting device of the machine.

One construction for the target is shown in FIG. 3. It comprises a wall 80 defining an open cavity 82, with two pairs of LED/photosensitive detector pairs 84 and 86 spaced apart axially in the wall of the target, and, between these pairs, compressed air injectors 88 and 90 for removing swarf from the tool. The first LED/photosensitive detector pair 84 is coupled to means (not shown) for slowing down horizontal movement of the tool as the latter is inserted into the cavity, and the second pair is coupled to means (not shown) for determining the exact position of the spindle nose 12 when the tip of the tool passes that second pair. The second pair may be replaced by a proximity switch 92 (shown in broken lines).

The machine can be operated as follows: an operator 5 first loads the egg-box tool store 17 with the tools required for the variety of jobs which the machine is to perform. The computer is told which tools, including their sizes and shapes, are contained in the egg-box store, and in which hole of the egg-box store each tool is held. The computer is further informed as to the diameters, depths and other characteristics of the holes which the machine is to bore in each of a number of different shapes and sizes of workpiece. The first workpiece 100 is mounted on the face 10a of the table 10 which is for the time being uppermost. The operator may now press an indexing button 94 which causes the table to be rotated through 90° so that the workpiece 100 which he just attached to the uppermost face of the table 10 is now rotated downwardly to face the tool and spindle nose 12 of the machine. If the computer 18 has not been informed of the order in which workpieces are to be operated on, he may now enter into the computer which particular workpiece he has just loaded. Alternatively he may load the machine in a particular order which he has already entered into the computer. The machine now carries out a drilling routine on the workpiece 100 he has just loaded leaving him free to load the next workpiece on the new face of the table 10 which is now uppermost. The second loading operation can be performed simultaneously with the drilling routine on the first workpiece. On the next indexing of the table 10, swarf can be blown from the first workpiece by the compressed-air injector 32 underneath the table 10, while at the same time the drill is operating on the second workpiece, and a third workpiece is being loaded onto the new face which is now uppermost.

In this way, it can be seen that idleing time of the machine is very much reduced, or completely done away with. It can also be seen that the swarf tends to fall away from the drilling equipment and the table 10 on which the workpiece is supported, through the vertical gap 14, and that the workpiece is further cleaned by the compressed air injector 32 which is on the underneath side of the table 10. In this way, neither the workpiece nor the drilling equipment is fouled by swarf and, as each work face with its workpiece becomes the uppermost face of the table again it provides a finished product clean of swarf and ready for removal by the operator.

Although operation of the machine has been described with reference to an operator, it will be appreciated that the latter functions could be performed automatically by robots.

During a drilling routine for any given workpiece, at each change of tool the spindle nose 12 is shifted rapidly back to the egg-box tool store 17 where a tool-change procedure is followed, the new tool is positioned in the nose 12, the tip of the tool is inserted into the zeroing or off-setting target 70, and the spindle nose 12 is then moved to the workpiece. All of these movements are performed with the use of the drive motors 50, 52 and 54 under the control of the computer 18. Because of the low inertia of the spindle nose 12 and the various other moveable parts involved, and also in view of the power of the drive motors themselves, a tool change can be accomplished in a matter of seconds, or possibly even more quickly than that.

The described configuration of the machine provides a flat layout with a relatively small vertical extent, so that the machine can be used as a desk-top piece of equipment and can be made as an extremely versatile and flexible manual/automatic system. The indexing of the table affords safety in the event that a workpiece is mounted on the table manually at the same time as another workpiece on another face of the table is being machined.

Although the machine has been described as a drilling machine with a cubic table, various modifications will readily occur to a reader of this specification who is skilled in the art, without taking the machine beyond the invention.

The cubic table illustrated could be replaced by a frusto-conical table rotatable about an axis which slants at 45° to the vertical, the frusto-conical side of the table being at 45° to this axis so that rotation of the table through 180° about its axis can produce a movement from a horizontal uppermost position to a vertical side position, equivalent to a 90° indexing of the cubic table.

In another modified form of the machine, the cubic table may be cantilevered from one side and the opposite side used as a fifth working face for drilling into sides of the workpiece. The table may further be mounted for rotation about a verical axis to allow the workpiece on the fifth face to be drilled on a front face thereof.

The machine has been described as a drilling machine, but it could be modified to perform milling or boring operations, for example. Furthermore, it would be possible to perform machining on more than one side of the cube simultaneously. For example, in the illustrated machine, a further spindle nose and drive assembly could be arranged on the right-hand side of the table 10, in addition to the one on the left-hand side, for machining a workpiece for the time being on the far work face of the table as viewed in FIG. 1.

I claim:

1. A machine tool comprising:
   (a) a workpiece support;
   (b) tool-holder mount support means adjacent to said workpiece support and to one side thereof;
   (c) a tool-holder mount, supported by said tool-holder mount support means to be moveable in three mutually perpendicular directions to enable said tool-holder mount to be moved to enable the machine tool to operate on different parts of a workpiece whilst the latter is held stationary by said workpiece support in a machining position which is horizontally displaced from said tool-holder mount and from a tool held by said tool-holder mount, and which is generally at the same vertical level as said tool-holder mount and such a tool, whereby swarf is free to fall away from the workpiece without fouling the tool-holder mount support means or the workpiece itself; and
   (d) prime mover drive means coupled to said tool-holder mount support means to move said tool-holder mount in said three mutually perpendicular directions; and
   (e) index means on which said workpiece support is mounted, said index means having a horizontal indexing axis of rotation which is generally at the same vertical level as said tool holder mount and which is generally at right angles to the machine tool spindle axis, said workpiece support having at least two support faces directed away from said indexing axis, to enable said workpiece support to be indexed through different positions, indexing of said workpiece support enabling one of said at least two support faces to be turned from a workpiece loading position in which the workpiece can be mounted on that face, to said machining position in which such a workpiece is presented to the tool holder, to enable one workpiece to be loaded on one of said at least two support faces whilst another workpiece on the other of said at least two support faces is being simultaneously machined by the machine tool.

2. A machine tool comprising:
   (a) a workpiece support;
   (b) a tool store which is positioned adjacent to said workpiece support and which provides a plurality of storage retainer means for respective tools;
   (c) tool-holder mount support means which extend from a position adjacent to said workpiece support and to one side thereof to a position adjacent to said tool store;
   (d) a tool-holder mount, supported by said tool-holder mount support means to be moveable in three mutually perpendicular directions to enable said tool-holder mount to be moved to select any one of a plurality of tools held in said tool store, and to enable the machine tool to operate with the selected tool on different parts of a workpiece whilst the latter is held stationary by said workpiece support in a machining position which is horizontally displaced from said tool-holder mount and from a tool held by said tool-holder mount, and which is generally at the same vertical level as said tool-holder mount and such a tool, whereby swarf is free to fall away from the workpiece without fouling the tool-holder mount support means or the workpiece itself;
   (e) index means on which said workpiece support is mounted, said index means having a horizontal indexing axis of rotation which is generally at the same vertical level as said tool holder mount and which is generally at right angles to the machine tool spindle axis, said workpiece support having at least two support faces directed away from said indexing axis, to enable said workpiece support to be indexed through different positions, indexing of said workpiece support enabling one of said at least two support faces to be turned from a workpiece loading position in which the workpiece can be mounted on that face, to said machining position in which such a workpiece is presented to the tool holder, to enable one workpiece to be loaded on one of said at least two support faces whilst another workpiece on the other of said at least two support faces is being simultaneously machined by the machine tool;
   (f) drive means of said tool-holder mount support means which serve to move said tool-holder mount in said three mutually perpendicular directions; and
   (g) electrical circuitry connected to said drive means and said tool-holder mount to operate the drive means, and hence the position of said tool-holder mount, and to machine the workpiece.

3. A machine tool comprising:
   (a) a workpiece support;
   (b) swarf-collecting means extending underneath said workpiece support to collect swarf from a workpiece which has been machined by the machine tool;
   (c) tool-holder mount support means adjacent to said workpiece support and to one side thereof;
   (d) a tool-holder mount, supported by said tool-holder mount support means to be moveable in three mutually perpendicular directions to enable said tool-holder mount to be moved to enable the machine tool to operate on different parts of a workpiece whilst the latter is held stationary by said workpiece support in a machining position which is horizontally displaced from said tool-holder mount and from a tool held by said tool-holder mount, and which is generally at the same vertical level as said tool-holder mount and such a tool, whereby swarf is free to fall away from the workpiece without fouling the tool-holder mount support means or the workpiece itself;
   (e) index means on which said workpiece support is mounted, said index means having a horizontal indexing axis of rotation which is generally at the same vertical level as said tool holder mount and which is generally at right angles to the machine tool spindle axis, said workpiece support having at least two support faces directed away from said indexing axis, to enable said workpiece support to be indexed through different positions, indexing of said workpiece support enabling one of said at least two support faces to be turned from a workpiece loading position in which the workpiece can be mounted on that face, to said machining position in which such a workpiece is presented in the tool holder, to enable one workpiece to be loaded on one of said at least two support faces whilst another workpiece on the other of said at least two support faces is being simultaneously machined by the machine tool, and from the said machining position to a downwardly directed position in which the workpiece is directed towards the swarf-collecting means;

(f) drive means of said tool-holder mount support means which serve to move said tool-holder mount in said three mutually perpendicular directions; and (g) electrical circuitry connected to said drive means and said tool-holder mount to operate the drive means, and hence the position of said tool-holder mount, and to machine the workpiece.

4. A machine tool comprising:

(a) a workpiece support;

(b) swarf-collecting means extending underneath said workpiece support to collect swarf from a workpiece which has been machined by the machine tool;

(c) tool-holder mount support means adjacent to said workpiece support and to one side thereof;

(d) a tool-holder mount, supported by said tool-holder mount support means to be moveable in three mutually perpendicular directions to enable said tool-holder mount to be moved to enable the machine tool to operate on different parts of a workpiece whilst the latter is held stationary by said workpiece support in a machining position which is horizontally displaced from said tool-holder mount and from a tool held by said tool-holder mount, and which is generally at the same vertical level as said tool-holder mount and such a tool, whereby swarf is free to fall away from the workpiece without fouling the tool-holder mount support means or the workpiece itself;

(e) index means on which said workpiece support is mounted, said index means having a horizontal indexing axis of rotation which is generally at the same vertical level as said tool holder mount and which is generally at right angles to the machine tool spindle axis, said workpiece support having at least two support faces directed away from said indexing axis, to enable said workpiece support to be indexed through different positions, indexing of said workpiece support enabling one of said at least two support faces to be turned from a workpiece loading position in which the workpiece can be mounted on that face, to said machining position in which such a workpiece is presented to the tool holder, to enable one workpiece to be loaded on one of said at least two support faces whilst another workpiece on the other of said at least two support faces is being simultaneously machined by the machine tool, and from the said machining position to a downwardly directed position in which the workpiece is directed towards the swarf-collecting means; and (f) drive means of said tool-holder mount support means which serve to move said tool-holder mount in said three mutually perpendicular directions.

5. A machine tool comprising:

(a) a workpiece support;

(b) swarf-collecting means extending underneath said workpiece support to collect swarf from a workpiece which has been machined by the machine tool;

(c) a tool store which is positioned adjacent to said workpiece support and which provides a plurality of storage retainer means for respective tools;

(d) tool-holder mount support means which extend from a position adjacent to said workpiece support and to one side thereof to a position adjacent to said tool store;

(e) a tool-holder mount, supported by said tool-holder mount support means to be moveable in three mutually perpendicular directions to enable said tool-holder mount to be moved to select any one of a plurality of tools held in said tool store, to enable the machine tool to operate with the selected tool on different parts of a workpiece whilst the latter is held stationary by said workpiece support in a machining position which is horizontally displaced from said tool-holder mount and from a tool held by said tool-holder mount, and which is generally at the same vertical level as said tool-holder mount and such a tool, whereby swarf is free to fall away from the workpiece without fouling the tool-holder mount support means or the workpiece itself;

(f) index means on which said workpiece support is mounted, said index means having a horizontal indexing axis of rotation which is generally at the same vertical level as said tool holder mount and which is generally at right angles to the machine tool spindle axis, said workpiece support having at least two support faces directed away from said indexing axis, to enable said workpiece support to be indexed through different positions, indexing of said workpiece support enabling use of said at least two support faces to be turned from a workpiece loading position in which the workpiece can be mounted on that face, to said machining position in which such a workpiece is presented to the tool holder, to enable one workpiece to be loaded on one of said at least two support faces whilst another workpiece on the other of said at least two support faces is being simultaneously machined by the machine tool;

(g) drive means of said tool-holder mount support means which serve to move said tool-holder mount in said three mutually perpendicular directions; and (h) electrical circuitry connected to said drive means and said tool-holder mount to operate the drive means, and hence the position of said tool-holder mount, and to machine the workpiece.

6. A machine tool comprising:

(a) a workpiece support;

(b) a tool store positioned adjacent to said workpiece support providing a plurality of storage locations for respective tools;

(c) a tool-end detector adjacent to said workpiece support and said tool store capable of detecting the presence of the end of a tool;

(d) tool-holder mount support means which extend from a position adjacent to said workpiece support and to one side thereof, to a position adjacent to said tool store;

(e) a tool-holder mount, supported by said tool-holder mount support means to be moveable in three mutually perpendicular directions to enable said tool-holder mount to be moved to select any one of a plurality of tools held in said tool store, to enable the selected tool to be moved to said tool-end detector and thus enable the length of the selected tool to be ascertained, and to enable the machine tool to operate with the selected tool on different parts of a workpiece whilst the latter is held stationary by said workpiece support in a machining position which is horizontally displaced from said tool-holder mount and from a tool held by said tool-holder mount, and which is generally at the same vertical level as said tool-holder mount and such a tool, whereby swarf is free to fall away from the workpiece without fouling the tool-holder mount support means or the workpiece itself;

(f) index means on which said workpiece support is mounted, said index means having a horizontal indexing axis of rotation which is generally at the same vertical level as said tool holder mount and which is generally at right angles to the machine tool spindle axis, said workpiece support having at least two support faces directed away from said indexing axis, to enable said workpiece support to be indexed through different positions, indexing of said workpiece support enabling one of said at least two support faces to be turned from a workpiece loading position in which the workpiece can be mounted on that face, to said machining position in which such a workpiece is presented to the tool holder, to enable one workpiece to be loaded on one of said at least two support faces whilst another workpiece on the other said at least two support faces is being simultaneously machined by the machine tool, and from said machining position to a downwardly directed position in which the workpiece is directed towards the swarf collecting means;

(g) drive means of said tool-holder mount support means which serve to move said tool-holder mount in said three mutually perpendicular directions; and (h) electrical circuitry connected to said drive means, said tool-holder mount and said tool end detector to operate the drive means, and hence the position of said tool-holder mount, and to machine the workpiece, in dependence upon the value of the length of the tool.

7. A machine tool comprising:
(a) a workpiece support;
(b) swarf-collecting means extending underneath said workpiece support to collect swarf from a workpiece which has been machined by the machine tool;
(c) a tool store positioned adjacent to said workpiece support providing a plurality of storage locations for respective tools;
(d) a tool-end detector adjacent to said workpiece support and said tool store capable of detecting the presence of the end of a tool;
(e) tool-holder mount support means which extend from a position adjacent to said workpiece support and to one side thereof, to a position adjacent to said tool store;
(f) a tool-holder mount, supported by said tool-holder mount support means to be moveable in three mutually perpendicular directions to enable said tool-holder mount to be moved to select any one of a plurality of tools held in said tool store, to enable the selected tool to be moved to said tool-end detector and thus enable the length of the selected tool to be ascertained, and to enable the machine tool to operate on different parts of a workpiece whilst the latter is held stationary by said workpiece support in a machining position which is horizontally displaced from said tool-holder mount and from a tool held by said tool-holder mount, and which is a tool held by said tool-holder mount, and which is enerally at the same vertical level as said tool-holder mount and such a tool, whereby swarf is free to fall away from the workpiece without fouling the tool-holder mount support means or the workpiece itself;

(g) index means on which said workpiece support is mounted, said index means having a horizontal indexing axis of rotation which is generally at the same vertical level as said tool holder mount and which is generally at right angles to the machine tool spindle axis, said workpiece support having at least two support faces directed away from said indexing axis, to enable said workpiece support to be indexed through different positions, indexing of said workpiece support enabling one of said at least two support faces to be turned from a workpiece loading position in which the workpiece can be mounted on that face, to said machining position in which such a workpiece is presented to the tool holder, to enable one workpiece to be loaded on one of said at least two support faces whilst another workpiece on the other of said at least two support faces is being simultaneously machined by the machine tool, and from said machining position to a downwardly directed position in which the workpiece is directed towards the swarf collecting means;

(h) drive means of said tool-holder mount support means which serve to move said tool-holder mount in said three mutually perpendicular directions; and (i) electrical circuitry connected to said drive means, said tool-holder mount and said tool end detector to operate the drive means, and hence the position of said tool-holder mount, and to machine the workpiece, in dependence upon the value of the length of the tool.

8. A machine tool comprising:
(a) a workpiece support;
(b) a tool store positioned adjacent to said workpiece support;
(c) tool-holder mount support means which is adjacent to said workpiece support and is to one side thereof, and which also extends to a position adjacent to said tool store and to one side thereof;
(d) a tool-holder mount, supported by said tool-holder mount support means to be moveable in three mutually perpendicular directions to enable said tool-holder mount to select any one of a plurality of tools held in said tool store, to enable the selected tool to be moved to enable the machine tool to operate on different parts of a workpiece whilst the latter is held stationary by said workpiece support in a machining position which is horizontally displaced from said tool-holder mount and from the selected tool held by said tool-holder mount, and which is generally at the same vertical level as said tool-holder mount and such a tool, whereby swarf is free to fall away from the workpiece without fouling the tool-holder mount support means or the workpiece itself;

(e) prime mover means coupled to said tool-holder mount support means to move said tool-holder mount in said three mutually perpendicular directions;

(f) index means on which said workpiece support is mounted, said index means having a horizontal indexing axis of rotation which is generally at the same vertical level as said tool holder mount and which is generally at right angles to the machine tool spindle axis, said workpiece support having at least two support faces directed away from said indexing axis, to enable said workpiece support to be indexed through different positions, indexing of said workpiece support enabling one of said at least two support faces to be turned from a workpiece loading position in which the workpiece can be mounted on that face, to said machining position in which such a workpiece is presented to the tool holder, to enable one workpiece to be loaded on one of said at least two support faces whilst another workpiece on the other of said at least two support faces is being simultaneously machined by the machine tool; and (g) a plurality of tool retainers of said tool store, spaced apart in a plane which faces said tool-holder mount support means, whereby said mutually perpendicular directions of movement of said tool-holder mount are alone sufficient to effect selection of a tool thereby from said tool store.

* * * * *